(12) United States Patent
Sun et al.

(10) Patent No.: US 7,679,851 B1
(45) Date of Patent: Mar. 16, 2010

(54) METHODS AND STRUCTURE FOR IMPROVED DISK HEAD SWITCHING TO AVOID ZIPPER ZONES

(75) Inventors: Yu Sun, Fremont, CA (US); Don Brunnett, Pleasonton, CA (US); Lin Guo, Saratoga, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1004 days.

(21) Appl. No.: 11/122,838

(22) Filed: May 5, 2005

Related U.S. Application Data

(60) Provisional application No. 60/599,670, filed on Aug. 6, 2004.

(51) Int. Cl.
*G11B 5/09* (2006.01)

(52) U.S. Cl. .................. 360/48; 360/75; 360/77.02; 360/78.08

(58) Field of Classification Search ............. None
See application file for complete search history.

(56) References Cited

U.S. PATENT DOCUMENTS

| | | | | |
|---|---|---|---|---|
| 4,823,212 A * | 4/1989 | Knowles et al. | ......... | 360/77.08 |
| 4,839,753 A * | 6/1989 | Ide et al. | ............. | 360/48 |
| 4,876,618 A * | 10/1989 | Ide et al. | ............. | 360/78.13 |
| 4,928,186 A * | 5/1990 | Matsumoto et al. | ......... | 360/21 |
| 5,903,411 A * | 5/1999 | Tomita et al. | ............ | 360/78.14 |
| 5,963,392 A * | 10/1999 | Sri-Jayantha et al. | ...... | 360/75 |
| 6,034,837 A * | 3/2000 | Purkett | ................ | 360/78.04 |
| 6,088,177 A * | 7/2000 | Onoda et al. | ............. | 360/48 |
| 6,130,796 A * | 10/2000 | Wiselogel | ............. | 360/75 |
| 6,185,063 B1 | 2/2001 | Cameron | | |
| 6,262,857 B1 * | 7/2001 | Hull et al. | .............. | 360/51 |
| 6,433,948 B1 * | 8/2002 | Lee | ....................... | 360/75 |
| 6,714,369 B2 * | 3/2004 | Miles | .................... | 360/51 |
| 6,967,810 B2 * | 11/2005 | Kasiraj et al. | .......... | 360/78.04 |
| 7,082,007 B2 * | 7/2006 | Liu et al. | .............. | 360/77.02 |
| 7,359,133 B2 * | 4/2008 | Yasunaga | ............... | 360/48 |
| 7,405,893 B2 * | 7/2008 | Bi et al. | ................ | 360/48 |
| 7,567,403 B2 * | 7/2009 | Sacks et al. | ............. | 360/75 |
| 2003/0197968 A1 * | 10/2003 | Sacks et al. | ............. | 360/75 |
| 2005/0069298 A1 | 3/2005 | Kasiraj et al. | | |
| 2005/0231842 A1 * | 10/2005 | Pang et al. | .............. | 360/31 |

FOREIGN PATENT DOCUMENTS

JP 2000268516 A * 9/2000

* cited by examiner

*Primary Examiner*—Dismery E Mercedes
(74) *Attorney, Agent, or Firm*—Westman, Champlin & Kelly, P.A.

(57) ABSTRACT

Methods and structure for switching heads on a multiple recording surface disk drive that uses bi-directional radial writing toward a zipper zone at a middle diameter. When switching from a first head to a second head, features and aspects hereof assure that the second head will not be positioned in the zipper zone of the corresponding second surface and hence will not lose track following servo synchronization and control. In one aspect, added buffer or guard tracks having valid servo information but no data are added on either side of the zipper zone to assure that under the worst-case misalignment of surfaces the second head will not be positioned in its corresponding zipper zone when switching from the first head.

7 Claims, 7 Drawing Sheets

METHODS AND STRUCTURE FOR IMPROVED DISK HEAD SWITCHING TO AVOID ZIPPER ZONES

RELATED PATENTS

This patent application is related to and claims priority to U.S. Provisional Patent Application Ser. No. 60/599,670 filed 6 Aug. 2004 and entitled: Apparatus for Switching Head when Zipper Track is Present which is hereby incorporated by reference.

BACKGROUND OF THE INVENTION

1. Field of the Invention

The present invention relates generally to disk drive head switching and track following servo operation and more specifically relates to methods and structures for assuring that switching from a first head to a second head cannot leave the second head in a "zipper zone" of its corresponding surface to thereby lose track following synchronization.

2. Discussion of Related Art

Computing storage subsystems generally utilize rotating, magnetic, disk storage devices for rapid, random access to large volumes of stored data. In general, stored information on a rotating magnetic disk drive comprises magnetic flux density changes recorded around the circumference of concentric tracks positioned radially from the inner diameter (ID) of a disk media recording surface to the outer diameter (OD) of a disk media surface. Present day disk drives typically include a plurality of such recording media stacked on a common rotating spindle and each with a corresponding read/write head for recording information on the corresponding magnetic recording surface and for sensing previously recorded data therefrom. The plurality of read/write heads are typically arranged on actuator arms. A plurality of such arms are typically arranged in a comb-like structure between the various disk recording surfaces such that a read/write head is "flying" adjacent its corresponding recording media surface. The comb-like structure is actuated so that all read/write heads may be radially positioned to a particular concentric track. The read/write head associated with each disk drive recording media surface is therefore moved in unison with all other read/write heads. In other words, each read write head is positioned over substantially the same concentric track position—each on its corresponding magnetic recording surface. Though each of the heads of the comb-like structure may be roughly positioned to a common radial track position, the head position must be finely tuned while in use to more accurately position the head for reading or writing on the desired track. Servo control information may be pre-written on the disk media recording surface at various points about the circumference of each track to identify the track position of each concentric track (e.g., the track number and other relevant information regarding the track). The servo control information is read from the head and processed to allow a servo control mechanism to finely tune the radial position of the head relative to the center of the track as data is being read or written by the head on that track. To allow this fine tuning of radial position based on recorded servo information on each track, only one head is used at a time and the disk drive controller logic switches between multiple heads as needed to read or write the requested blocks of data.

It is common in disk storage systems to switch from one recording head to another recording head while reading or writing to avoid time consuming mechanical delays (latency) associated with radially repositioning the comb-like structure of multiple read/write heads and the delay in allowing the mechanism to settle at its new radial position. Switching from one head to another head incurs no such mechanical latency but rather merely incurs electronic switching latency and any requisite processing delays associated with re-synchronizing servo and timing information recorded on each concentric track and used for track following servo control.

Servo information is typically pre-written on disk drive media surfaces during the manufacturing process to accurately place the servo information that defines the radial position of each track thereon. Though the servo information is carefully and precisely placed on the multiple disk surfaces during the manufacturing process, mechanical and environmental conditions may change slightly over time. Thus, as a disk drive controller switches from one head to another, some delay is incurred in tuning the precise position of the next head based on the servo information recorded on its corresponding track position.

Ever increasing demands for storage capacity have led disk drive manufacturers to seek ever higher storage densities. Storage density is typically measured both linearly and radially. Linear density is measured as bits per inch ("BPI") in the longitudinal direction of a recorded track (i.e., in the direction in which the head flies over the rotating disk media). Radial density is measured in the radial direction as tracks per inch ("TPI"). A real density is a common measurement of the total storage density of a disk drive and is determined as the product of linear density (BPI) and radial density (TPI).

Numerous well-known techniques have been applied to increase in the linear density recorded around the circumference of each concentric track. Some such techniques involve simple encoding algorithms to increase the linear density while maintaining high reliability. In so-called longitudinal recording, magnetic flux changes are recorded "longitudinally" (i.e., substantially parallel to the direction of the magnetic surface rotating under the read write ahead). In "vertical" or "perpendicular" recording techniques, magnetic flux changes are recorded substantially perpendicular to the longitudinal direction of the head/media movement. Vertical or perpendicular recording provides a higher linear density of storage.

Other techniques are applied to increase the radial density (TPI). In the radial direction, the distance between the center of a recorded track and the center of an adjacent recorded track ("track pitch") tends to be larger than the width required for a successful reading. Placement of the servo information written at time of manufacture determines the center position of each track. Placing the servo information closer for each track increases the radial density. Spacing the tracks further apart than the minimum distance allows tracks to be more easily randomly re-written though the newly written (or re-written) information may be slightly displaced relative to older information previously at the same track. The magnetic flux changes representing one track are far enough from a next adjacent track that one will not interfere with reading of the other. If an adjacent track were recorded too close to another track, the sensing by the read head may receive interference sensed as noise in reading the intended track. Thus the signal to noise ratio of the data to be read may be reduced. By keeping the tracks further apart to allow for random re-writing at different times and under different conditions, the interference between tracks is reduced and the signal to noise ratio for data to be read is maintained at a higher level.

One technique generally known in the disk drive art for increasing radial density in certain storage applications is to record information in a streaming manner from one track to a next adjacent track in sequential order. Where data is so recorded sequentially with no need to randomly re-write individual tracks, the recorded data may be applied to the magnetic media at a very high radial density by densely packing the recorded information such that a next sequential track abuts or even partially overwrites an earlier recorded track. Such an operation is often referred to as "trimming" in that it trims the track pitch to nearly the minimum required for accurately sensing data. Such techniques are more readily applied in vertical or perpendicular recording but may also be applied in longitudinal recording. Key to such applications is that the data is written in a substantially continuous, sequential stream and read in a substantially continuous, sequential stream over the entire recorded area of the disk drive. In such applications the mechanical and environmental parameters that may affect track positioning and following controls will not change substantially during the continuous read or write sequence. Thus, track following servo controls may more reliably follow the center position of each concentric track and allow for closer spacing of the concentric tracks. Numerous disk storage applications may utilize such sequential writing/reading techniques such as audio/video capture or presentation and other forms of streamed data capture and presentation.

Where such overlap and trim techniques are used in recording data at a higher radial density, it is also generally known to record the concentric tracks in each of two radial directions. In other words the disk surface is written bi-directionally—a first portion of the disk is recorded on sequential tracks starting from the inner diameter (ID) of a recording surface moving toward a middle diameter (MD) and a second portion of the disk drive is recorded on sequential tracks starting from an outer diameter (OD) to the middle diameter (MD). The middle diameter (MD) is in general selected as a position where the read/write head is at a minimally skewed angle with respect to the tangent line of recording on the circular track. As the read/write head is radially positioned more inward or more outward, the geometry of the actuator arm and head mounted thereon changes a bias angle imposed between the angle of the write head and the concentric track on which it records. Typically, disk drive manufacturers try to configure the heads and actuator arms so that the bias angle is minimized at a center point in the radial travel of the head and hence averaged over the entire radial range of head travel. The middle diameter (MD) is therefore often referred to as the "zero skew" position.

Where the two directions of writing join at approximately the MD concentric track position, the overlap and trim features of the high radial density writing may render one or more tracks near MD unusable. This area is sometimes referred to as a "zipper track" or "zipper zone". As used herein, both terms refer to a zone of multiple tracks near the MD track location on each surface potentially unusable because of the overlap in bi-directional writing.

A problem arises where such bi-directional sequential writing generates such a zipper zone with multiple surfaces and associated multiple read/write heads. Track following servo mechanisms associated with a read/write head may be used to avoid the zipper zone on any surface of the disk drive. If the read/write head were allowed to enter the zipper zone, overlapped writing may render servo information useless or unreadable and hence lose synchronization for track following servo mechanisms. Therefore, control mechanisms of such a disk drive utilizing bi-directional high radial density writing carefully avoid the zipper zone on each disk surface.

However, when it is desired to switch from one head to another head in a multiple surface disk drive, misalignment of track positioning between multiple read/write heads may cause a head switch operation to switch to a second read/write head that is presently physically positioned within the zipper zone of its corresponding disk surface. In other words, though a first head may be outside its corresponding zipper zone and the track following servo controls properly functioning, the electronic switch to the second head could occur while the second head (misaligned relative to the first head) is positioned within the zipper zone of its corresponding disk surface. The two surfaces may be slightly misaligned with respect to one another due to mechanical or environmental condition changes over time in the disk drive. When such an event occurs, track following servo mechanisms may lose synchronization because the second read/write head attempts to use servo information that has been improperly overwritten or is otherwise unreadable due to its location within the zipper zone. Recovery from such a track following servo error can be a time consuming event in disk drive control and hence can diminish disk drive performance.

It is evident from the above discussion that improved head switching techniques and structures are needed where a disk drive uses bi-directional, high radial density track writing techniques that generate an unusable zipper track or a zipper zone on each of multiple disk surfaces.

SUMMARY OF THE INVENTION

The present invention solves the above and other problems, thereby advancing the state of the useful arts, by providing a head switching process and structure to assure that a head switch operation does not lose track following synchronization in a disk drive using bi-directional, high radial density track writing techniques that create a zipper zone on the disk surfaces. Features and aspects hereof provide that a head switch operation first performs a seek operation to move the desired next head sufficiently away from its corresponding zipper zone prior to performing the electronic head switch operation. In one aspect, the seek operation may be a two stage seek where the seek operation is initiated using the first head (current head) track following servo information followed by a second seek operation using the second head (next head) track following servo information to reposition the second head back to the intended original track. In another aspect, a single seek operation may be initiated using the first head track following information and then completed using the second head track following information by changing the seek destination target track number once the track following information from the first head indicates that the second head is a safe distance to avoid the zipper zone associated with the second head. Yet another aspect hereof provides for additional unused tracks (buffer or guard tracks) on either side of the zipper zone of each surface the disk drive. These extra tracks are unused other than having valid servo information recorded therein and hence, in essence, extend the size of the zipper zone but with assured track servo information in the guard tracks. The larger space surrounding the zipper zone assures that, even under worst-case misalignment scenarios, switching from the first head to a second ahead will not at the cause the second head to be in an unusable portion of the zipper zone where no valid track following servo information may be located.

One feature hereof therefore provides a method operable in a multiple recording surface disk drive with a zipper zone on each surface, the method comprising: using a first head associated with a first recording surface of the disk drive wherein the use of the first head is outside the zipper zone of the first recording surface; and switching to use a second head associated with a second recording surface of the disk drive whereby the second head is assured of being outside the zipper zone of the second recording surface Another aspect hereof further provides that the method further comprises: initially formatting servo information on each disk surface with a guard band range of tracks adjacent either side of the radial position of the zipper zone of said each disk surface wherein the guard band range of tracks are not used for storing data, wherein the step of switching further comprises: switching from the first head positioned outside the guard band range of tracks to use of the second head, wherein the second head is assured to be outside the zipper zone of the second recording surface due to the size of the guard band range of tracks on the first recording surface.

Another aspect hereof further provides that the step of formatting further comprises: formatting servo information on said each disk surface with the guard band range of tracks on either side of the zipper zone radial position wherein the guard band range of tracks comprises a number of tracks sufficient to account for worst case misalignment of radial positions on the first recording surface relative to the second recording surface.

Another aspect hereof further provides that the step of formatting further comprises: formatting servo information on said each disk surface with the guard band range of tracks on either side of the zipper zone radial position wherein the guard band range of tracks comprises 100 tracks.

Another aspect hereof further provides that the step of formatting further comprises: formatting servo information on said each disk surface with the guard band range of tracks on either side of the zipper zone radial position wherein the guard band range of tracks comprises a number of tracks ("N") on either side of the radial position of the zipper zone where N is determined in accordance with parameters associated with the disk drive.

Another aspect hereof further provides that the step of switching further comprises: initiating a first seek operation to move the first head radially from an original track position represented by an original track number on the first recording surface to a new track position on the first recording surface further from the zipper zone of the first recording surface; and performing a second seek operation to move the second head radially from its present track position to a track position on the second recording surface corresponding to the original track number, wherein the present track position of the second head is assured to be outside of the zipper zone of the second recording surface due to the first seek operation.

Another aspect hereof further provides that the step of switching further comprises: completing the first seek operation prior to performing the second seek operation.

Another aspect hereof further provides that the step of performing the second seek operation further comprises: initiating the second seek operation prior to completion of the first seek operation.

Another aspect hereof further provides that the step of switching further comprises: reducing a settling time parameter associated with the first seek operation prior to initiating the first seek operation; completing the first seek operation using the reduced settling time parameter; and restoring the settling time parameter prior to performing the second seek operation.

Another aspect hereof further provides that the step of switching further comprises: initiating a seek operation to move the first head radially from an original track position represented by an original track number on the first recording surface to a new track position on the first recording surface further from the zipper zone of the first recording surface; responsive to initiating the first seek operation, estimating when the second head is assured to be out of the zipper zone of the second recording surface; responsive to the estimate that the second head is out of the zipper zone of the second recording surface, performing the steps of: reconfiguring a servo track following component of the disk drive to determine present track position from servo information sensed from the second head; and redirecting the target track position of the seek operation to move the second head radially from its present track position to a track position on the second recording surface corresponding to the original track number.

Another feature hereof provides a method operable in a disk drive having multiple recording surfaces each with a corresponding read/write head where each recording surface has a zipper zone, the method for switching from a first read/write head to a second read/write head comprising: determining whether the first read/write head is within a predetermined range of tracks surrounding the zipper zone of the recording surface corresponding to the first read/write head; responsive to determining that the first read/write head is within the predetermined range, performing the steps of: repositioning the first read/write head from its original radial position to a new radial position outside the predetermined range; switching to the second read/write head; and repositioning the second read/write head to a second radial position equal to the original radial position of the first read/write head.

Another aspect hereof further provides that the step of repositioning the first read/write head further comprises performing a seek operation using the first read/write head to move the first read/write head to the new radial position, and further provides that the step of repositioning the second read/write head further comprises performing a seek operation using the second read/write head to move the second read/write head to the second radial position.

Another aspect hereof further provides that the step of performing a seek operation using the first read/write head further comprises: reducing a settling time parameter of the disk drive prior to initiating the seek operation; and restoring the settling time parameter of the disk drive to a nominal value following completion of the seek operation.

Another aspect hereof further provides that the step of repositioning the first read/write head further comprises initiating a seek operation using the first read/write head to move the first read/write head to the new radial position, and wherein the step of repositioning the second read/write head further comprises redirecting the target track position of the seek operation to move the second read/write head to the second radial position.

Another feature hereof provides a method operable in a disk drive having multiple recording surfaces each associated with a corresponding read/write head, the method of formatting servo information comprising: formatting servo information on each disk surface with a guard band range of tracks adjacent either side of the radial position of a zipper zone of said each disk surface wherein the guard band range of tracks are not used for storing data.

Another aspect hereof further provides that the step of formatting further comprises: formatting servo information on said each disk surface with the guard band range of tracks on either side of the zipper zone radial position wherein the guard band range of tracks comprises a number of tracks sufficient to account for worst case misalignment of radial positions on a first recording surface relative to a second recording surface.

Another aspect hereof further provides that the step of formatting further comprises: formatting servo information on said each disk surface with the guard band range of tracks on either side of the zipper zone radial position wherein the guard band range of tracks comprises 100 tracks.

Another aspect hereof further provides that the step of formatting further comprises: formatting servo information on said each disk surface with the guard band range of tracks on either side of the zipper zone radial position wherein the guard band range of tracks comprises a number of tracks ("N") on either side of the radial position of the zipper zone where N is determined in accordance with parameters associated with the disk drive.

DETAILED DESCRIPTION OF THE DRAWINGS

Figure 1:
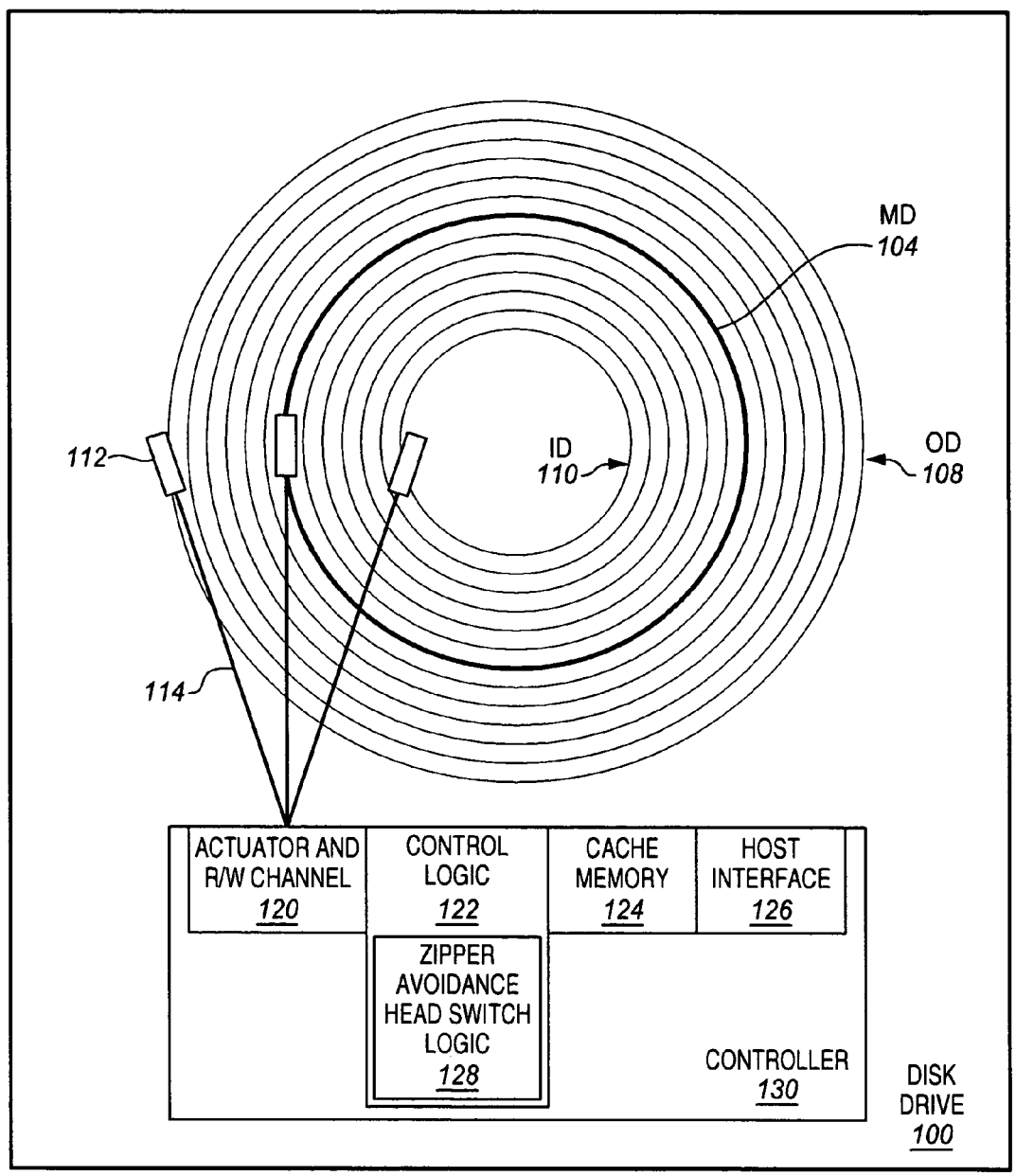
FIG. 1 is a schematic representation of a disk drive embodying features and aspects hereof to process head switch operations in the presence of a zipper track or zone.

FIG. 1 is a schematic representation of a top view of a disk drive 100 showing a single disk surface 102. Concentric tracks are logically formed on the surface 102 for storing information. Surface 102 is marked to indicate several such concentric track positions including the inner diameter track position ("ID") 110, the outer diameter track position ("OD") 108 and a middle diameter track position ("MD") 104. Each such surface 102 in a multiple surface disk drive 100 may be similarly formatted and is mechanically substantially aligned about a common central spindle (not shown—oriented perpendicular to the plane of FIG. 1) so that corresponding track positions on each surface are substantially aligned vertically (i.e., vertically aligned perpendicular to the plane of FIG. 1). A read/write head 112 attached to the end of a pivoting arm 114 is positionable over a selected concentric track to record (write) information thereon or to sense (read) previously recorded information. A disk controller 130 in disk drive 100 controls overall operation of the disk drive and may include a number of functional and/or structural elements such as actuator and r/w channel 120 to position the read/write head and to read/write information on the track position beneath the head; control logic 122 for overall control and scheduling of operations in the disk drive; cache memory 124 for temporary storage of information read from or to be written to the disk surfaces 102; and host interface 126 for interacting with an attached host device.

Those of ordinary skill in the art will readily recognize that any number of concentric tracks may be recorded on each surface 102 of a disk drive 100. The relatively small number of tracks shown on surface 102 is intended merely as suggestive of a typical layout of concentric tracks on a disk media surface. In addition, any number of surfaces each with a corresponding read/write head may be configured in a disk drive 100. Still further, the particular width of each concentric track position shown in FIG. 1 and the gaps between concentric tracks are not representative of typical track pitch or track spacing but rather are merely intended as suggestive of the concentric nature of tracks and the relative positions of ID, MD and OD. Still further, the thicker, bold circle representing middle diameter 104 is intended merely to emphasize the middle position for illustration and discussion herein.

As noted above, it is generally known in the art that for high radial density applications (higher TPI), it may be beneficial to record sequential tracks in a bi-directional manner such that approximately half of the tracks are recorded sequentially from outer diameter position 108 toward middle diameter position 104. The remainder of the tracks may be recorded sequentially from inner diameter position 110 toward middle diameter position 104. Head 112 and arm 114 are show in FIG. 1 in three positions—positioned substantially over ID, positioned substantially over MD, and positioned substantially over OD. Though much exaggerated for illustration and discussion, it can be seen that the position of the read/write head 112 relative to a tangent line of the concentric track at each position is skewed at OD and ID as compared to the position at MD. As generally known in the art, bi-directional recording allows track width and track pitch dimensions to be reduced despite these varying head skew or bias angles, thereby increasing radial density while also adjusting for the differing bias angles of the read/write head as mechanically positioned over the different track positions. In other words, the skew angle of the head relative to the tangent of a track under the head is best accounted for on the outer tracks by recording from the outer track position (OD) sequentially inward toward the middle position (MD) while the inner track bias angles are best compensated by recording from the inner track position (ID) sequentially outward toward the middle track position (MD).

As also noted above, such bi-directional recording inherently generates a zipper track or a zipper zone indicated by the bolded concentric track position at approximately the position of the middle diameter (MD) tracks 104. One or more track positions substantially located at the middle diameter (MD) location 104 may have unusable or otherwise unreadable servo track location information due to the overwrite and overlap of tracks written from outer diameter (OD) location 108 toward the middle diameter (MD) location 104 and the final track written in the opposing direction from inner diameter position (ID) 110 toward middle diameter position (MD) 104.

Control logic 122 is enhanced in accordance with features and aspects hereof to include zipper avoidance head switch logic element 128. The head switch logic 128 is operable to assure that when switching from a first r/w head associated with a first surface of the disk drive 100 to a second r/w head, the second r/w head will not be positioned within its zipper zone. Switching to a head presently positioned in its corresponding zipper zone may cause errors in verifying the position of the head. Servo track location information may be unreadable in the zipper zone and hence the location of the head may be indeterminable. Recovering from such a condition can be time consuming and hence may degrade overall performance of a disk drive.

Zipper avoidance head switch logic element 128 represents any suitable means for performing functions described herein for avoid the zipper zone on a recording surface when switching to a read/write head associated with that surface. Such means may include, for example, custom combinatorial logic circuits, suitably programmed instructions executable by a general or special purpose processor associated with the disk controller, of any other suitable means for implementing the functions described herein to avoid a zipper zone on a recording surface when switching to the read/write head associated with that surface. As indicated, the zipper avoidance head switch logic element 128 may be integrated with the control logic 122 of the disk controller. Those of ordinary skill in the art will recognize that the various functional elements shown within disk controller 130 of disk drive 100, as well as other functional elements useful in operating and interfacing with the disk drive 100, may be implemented as a matter of design choice highly integrated within any number of integrated circuit packages.

Figure 2:
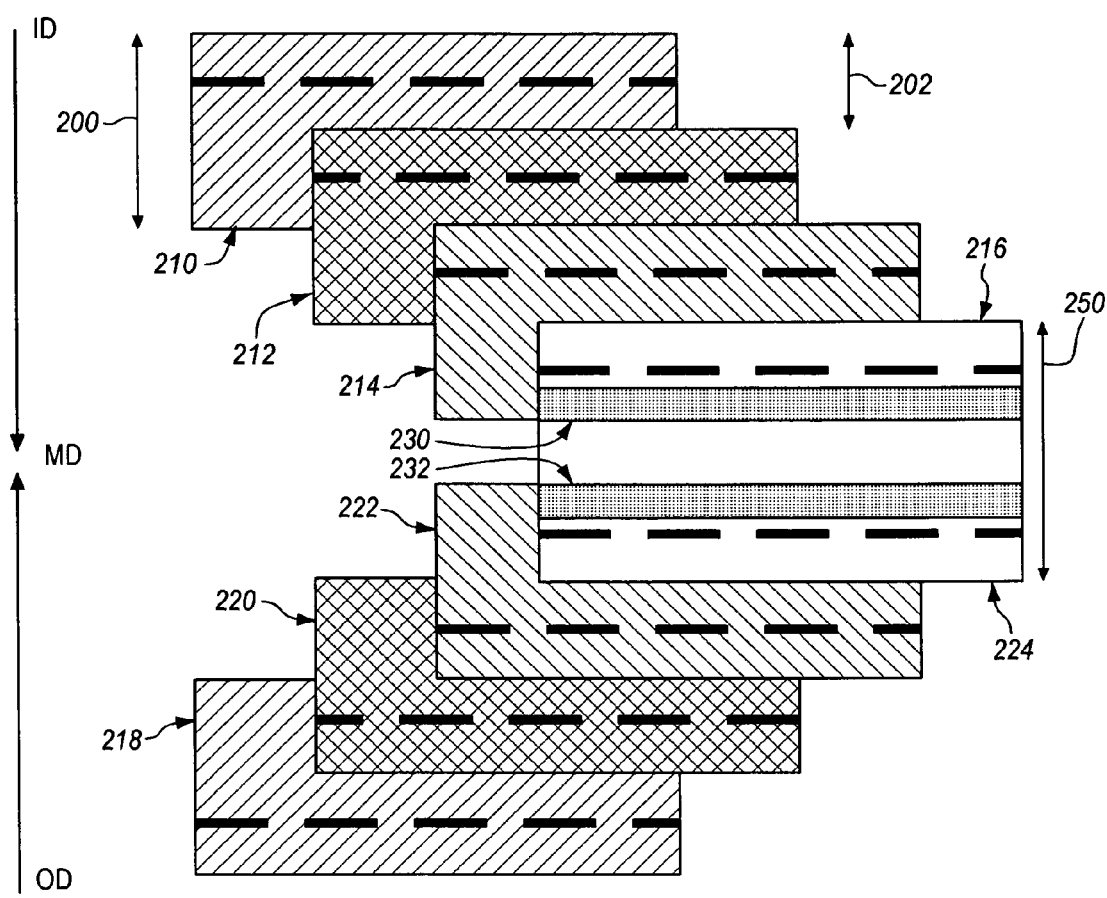
FIG. 2 is a block diagram showing exemplary tracks written in a bi-directional manner as presently known in the art so as to form a zipper zone substantially about the middle diameter track position.

FIG. 2 is a schematic representation of densely packed tracks (210 through 224) written sequentially in a bi-directional manner to thus generate a zipper track or zipper zone substantially about the MD track position. FIG. 2 shows four exemplary tracks (210, 212, 214, and 216) written in sequential order from inner diameter (ID) toward middle diameter (MD). In like manner, four tracks (218, 220, 222, and 224) are written in sequential order from an outer diameter (OD) position toward the middle diameter location (MD).

As generally known, a read/write head may generate a track width indicated by arrow 200 greater than the minimum track pitch 202 necessary for accurate reading of the recorded data. Track 210 may be recorded in a first rotation of the disk drive and track 212 may partially overlap a portion of the track width 200 of track 210 leaving a minimum required track pitch 202 useful for reading the data recorded in track 210. In like manner, track 214 overlaps a portion of track 212 leaving a minimum track pitch required for reading back information from track 212. Lastly, track 216, the last track written closest to the MD position during a first direction of sequential track writing, overlaps a portion of track 214. In like manner, in the opposite direction of sequential track writing from OD toward MD, track 218 is first written followed by track 220 overlapping a portion of 218, followed by track 222 and lastly track 224. Each subsequent track overlays a portion of the previously, sequentially recorded track. A dashed line in each track (210 through 224) indicates a useful center position for reading back information written on each track—centered in the remaining densely packed track pitch of each sequentially written track.

Those of ordinary skill in the art will recognize that writing of track 224 not only overlaps a portion of the previous sequential track 222 but also may overwrite a portion of track 216 written in the opposite direction. Such an overlap is indicated by the black stripe 230 within the normally usable track pitch of track to sixteen. If the tracks were written in a different order (i.e., OD through MD then ID through MD), writing of track 216 would similarly overwrite a useful portion of track 224 written in the opposite direction as indicated by black stripe 232. Therefore, one or both of tracks 216 and 224, written in opposite directions of the bi-directional writing operation, may be unusable or unreadable with regard to user data and/or track location servo information. The zipper zone of FIG. 2 is shown as both tracks 216 and 224, collectively indicated by arrow 250. If the track location servo information is overwritten so as to be unreadable or otherwise unusable, a read/write head positioned over such a track (i.e. track 216 or 224) may lose its track following servo synchronization. As noted above, such an event may require significant recovery time and hence negatively impacts overall performance of the disk drive.

Those of ordinary skill in the art will recognize that the particular dimensions for track width, track pitch and the overlap shown in FIG. 2 are merely intended as suggestive of the problems presently confronting the art. Actual dimensions for track width, track pitch and any overlap are substantially smaller than shown in FIG. 2. FIG. 2 is therefore intended nearly as suggestive of the problems confronting the present state of the art when a zipper track or zipper zone is created by bi-directional, sequential track writing at high radial densities.

Figure 3:
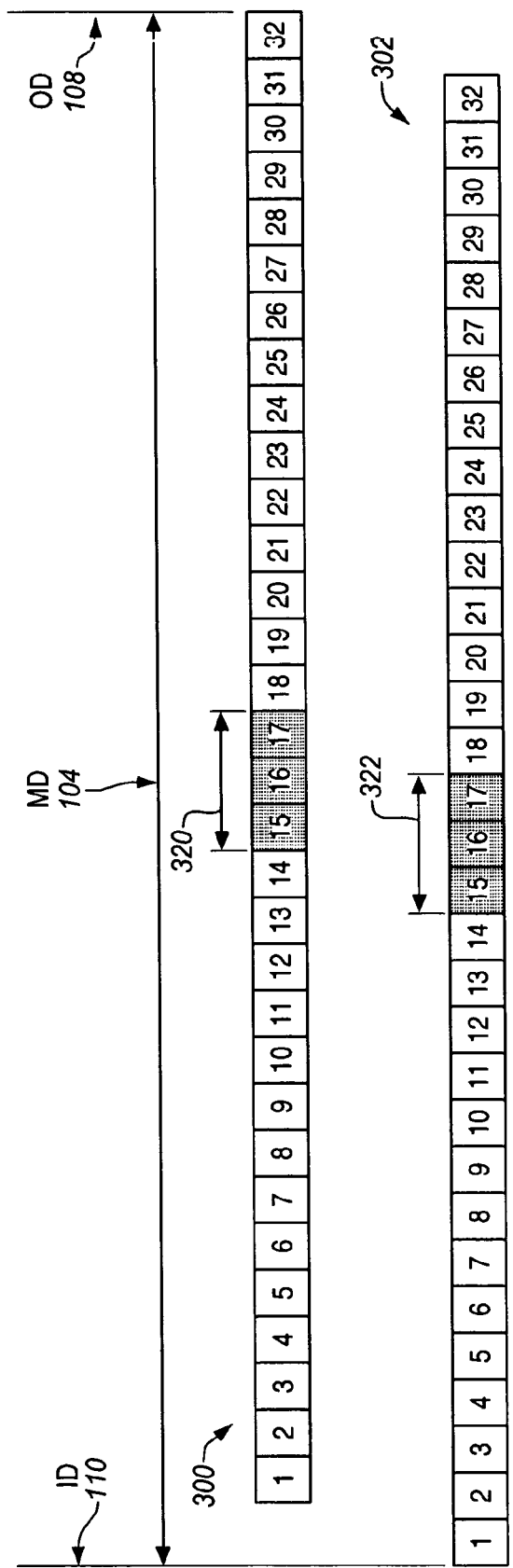
FIG. 3 is a block diagram representing tracks of multiple disk surfaces each with a corresponding zipper zone and exhibiting the misalignment problems presently confronting the state of the art when switching from a first read/write head associated with a first disk surface to a second read/write head associated with a second disk surface.

FIG. 3 is a schematic representation of track locations on each of multiple disk surfaces of a multiple surface disk drive. Surface 300 has track locations 1 through 32 as does disk surface 302. Each disk surface 300 and 302 has a corresponding read/write head coupled to a comb like actuator structure that positions all heads in unison in substantial vertical alignment (vertically with respect to the horizontal depiction of the disk surface as shown in FIG. 3. As shown in FIG. 3 various mechanical and/or environmental conditions may cause vertical misalignment of corresponding tracks on multiple surfaces. For example, track 1 on surface 300 is not vertically aligned with track 1 on surface 302. In like manner each corresponding track location on surface 300 and 302 is similarly vertically misaligned. Zipper zone 320 is shown approximately at the middle diameter location (MD 104) of surface 300. Zipper zone 320 indicates three track locations (tracks 15, 16 and 17) as having unreadable or otherwise unusable track location servo information (i.e., overwritten by the bi-directional writing process described above with respect to FIG. 2. Surface 302 similarly has a zipper zone 322 also comprising track locations 15, 16 and 17.

Although the disk surfaces may be vertically misaligned due to mechanical or other environmental conditions, the multiple corresponding read/write heads may remain substantially vertically aligned in their comb like structure. Thus, the read/write head servicing surface 300 may be presently positioned over a first track location while a read/write head servicing surface 302 may be positioned over a different track location due to the vertical misalignment of the multiple disk surfaces. For this reason it is common to reposition the second head when switching from a first head to restore the desired track location. For example, if the first head servicing surface 300 is presently positioned over track location 5, when switching to a second head servicing surface 302, a seek operation may be performed to reposition the second head correctly over its track location 5. However, as noted above, when the first head position is near zipper zone 320, switching heads may cause a switch to the second head while the second head is positioned in its zipper zone 322 and hence has no readable or usable track location servo information to perform the seek. For example, if a first head servicing surface 300 is presently positioned over track 14 on surface 300 then the second head servicing surface 302 will be presently positioned in its zipper zone 322 of surface 302 (i.e., somewhere within tracks 15 through 17 of surface 302. In such a situation, the seek operation attempting to reposition the second head after the head switch operation will generate an error condition because the second head cannot locate readable or usable track location servo information. FIG. 3 therefore demonstrates the problems presently known in the art when he using bi-directional, sequential track writing on densely packed tracks that may generate a zipper zone on each of multiple disk surfaces.

Figure 4:
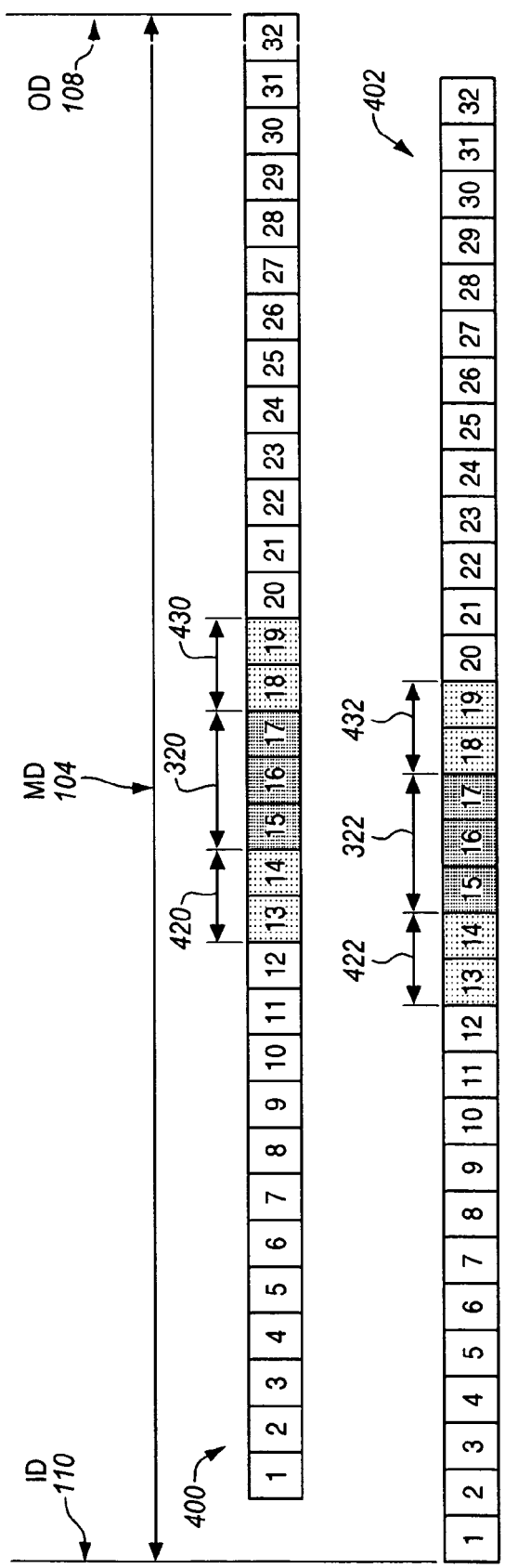
FIG. 4 is a block diagram suggesting one exemplary embodiment of features and aspects hereof having a guard band on either side of a zipper zone.

FIG. 4 is a block diagram similar to that of FIG. 3 but depicting an exemplary embodiment of the features and aspects hereof useful to avoid time consuming loss of track following synchronization when switching heads. In particular, surface 400 has a zipper zone 320, as above, comprising tracks 15, 16 and 17. Surface 402 also has a zipper zone 322 comprising tracks 15, 16 and 17. In accordance with features and aspects hereof, additional buffer or guard band tracks are allocated on either side of the zipper zone of each surface. Guard band tracks 420 comprising tracks 13 and 14 and guard band 430 comprising tracks 18 and 19 on surface 400 provide such buffering or guarding of zipper zone 320. In like manner, guard band 422 comprising tracks 13 and 14 and guard band 432 comprising tracks 18 and 19 provide buffer or guard zone protection for zipper zone 322 of surface 402.

Guard bands 420, 430, 422, and 432 help assure that the second head will not be presently located in its zipper zone when a switch is requested from a first head on surface 400 to the second head servicing surface 402. The guard band tracks may be tracks known to have valid track location servo information but are otherwise unused for storing of information on the disk drive surface. The size of the guard band (measured in number of tracks) should be adequate to account for maximum misalignment of the various surfaces of the disk drive under worst-case conditions. Depending on particular parameters of a particular application, the guard band on either side of the zipper zone may be as large as 100 tracks (or higher). In other applications, a much smaller number may be adequate in view of varying mechanical and environmental tolerances and specifications for a disk drive.

Since the first head will never be positioned in the range of tracks defined by the zipper zone expanded by the guard zone on either side (assuming the guard band is large enough for worst-case misalignment), switching to the second head will never allow the second head to be presently located within its zipper zone. Conversely, when switching from a first head servicing surface 400 to a second head servicing surface 402, the second head is assured to be located within the range of legitimate usable tracks or at least within the guard band associated with the zipper zone of the second surface (e.g., within the range defined by tracks 1-14 or 18-32). For example, as shown in FIG. 4, if the first head associated with surface 400 is presently positioned at track 12 of the first surface 400, a head switch to a second head associated with surface 402 will assure that the second head cannot be positioned within zipper zone 322 of surface 402. Rather, the second head will be positioned within guard band range 422 (e.g., somewhere within tracks 13 and 14 on surface 402). Since the guard band tracks are assured to have valid track location servo information, tracked following servo synchronization will not be lost.

Those of ordinary skill in the art will recognize that FIG. 4 is merely intended as representative of one possible, exemplary embodiment of features and aspects hereof to help assure that a head switch operation will not lose track following servo synchronization. The particular number of tracks on any surface, the size of the zipper zone measured in tracks, and the size of guard zones on either side of a zipper zone may all vary in accordance with the needs of a particular disk drive application. The particular sizes shown in FIG. 4 are merely intended as exemplary for purposes of description.

Figure 5:
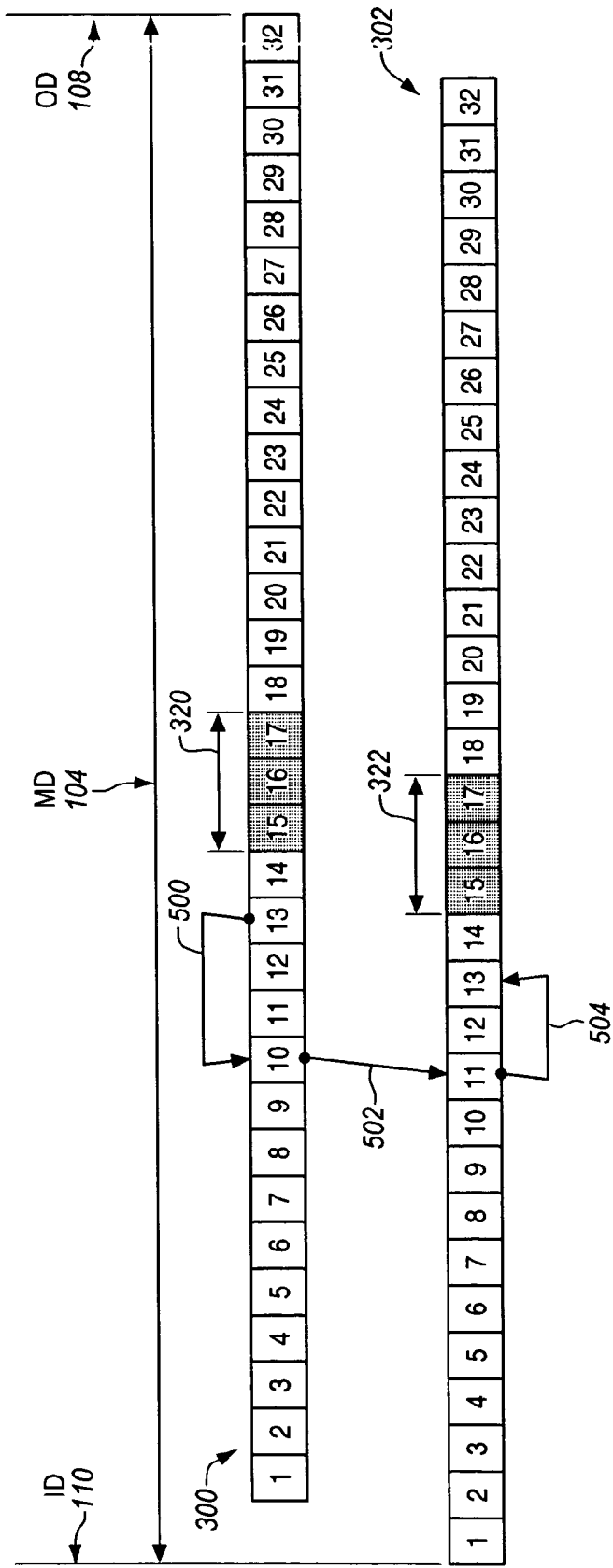
FIG. 5 is a block diagram suggesting another exemplary embodiment of features and aspects hereof wherein a head switch operation includes one or more seek operations.

FIG. 5 is a block diagram depicting another exemplary embodiment in accordance with features and aspects hereof for avoiding loss of track following servo synchronization. The exemplary embodiment of FIG. 5 generally entails performing a seek operation prior to electronically switching heads so as to move the first head on the first surface to a track location deemed to be safe for performing the head switch to the second head. A head switch is safe if it is performed in a manner that avoids the second head presently being positioned within its corresponding zipper zone. Surfaces 300 and 302 are similar to that of FIG. 3 above each including a zipper zone 320 and 322, respectively, each zipper zone comprising track locations 15, 16 and 17.

If the present position of the first head is close enough to zipper zone 320 on the first surface 300, a seek operation represented by arrow 500 may be initiated to move the first head to a new location further from its zipper zone. For example, as shown in FIG. 5, the present position of the first head associated with surface 300 may be track 13—deemed to be too close to the zipper zone tracks 15 through 17. Thus, a seek operation indicated by arrow 500 is initiated to move the first head on surface 300 to a safe location such as track location 10 deemed to be far enough from the zipper zone of any surface of the disk drive under worst-case misalignment conditions. As above with respect to FIG. 4 the number of tracks separation deemed to be a safe distance from the zipper zone may be determined in accordance with the needs of a particular disk drive application and its corresponding mechanical and environmental specifications and conditions.

After initiating the seek operation using the first head on surface 300, the seek may either be completed or may be redirected. If the first seek is allowed to complete, a head switch operation may follow as indicated by arrow 502 to switch from the first head to the second head. Following the head switch operation indicated by arrow 502, a second seek operation may be initiated to move the second head from its present location (e.g., track 11) to its desired original position (e.g., track 13 where the first head was originally positioned when the head switch was required). Thus, a two stage seek operation may be performed by initiating a seek operation on the first head while the first head is outside the range of the zipper zone. A head switch operation may follow while the first and second heads are both safely positioned away from the respective zipper zones. Finally, a second seek operation may be initiated to move the second head back to its intended original position.

Alternatively, a single seek operation may be utilized where the seek operation is redirected after a head switch operation. In other words, a single seek operation may be initiated as indicated by arrow 500. Control features within the disk drive may then determine when the first head has moved sufficiently to be safely displaced from the zipper zone of all surfaces. When the present location of the first head is deemed to be sufficiently safe with regard to the zipper zone location of any surface under worst-case mechanical and environmental conditions, a head switch may be performed followed by a redirection of the continuing seek operation. The redirection of the seek operation may cause the initiated seek to reverse direction and restore the second head to the intended original track location.

As above in FIG. 4, FIG. 5 is intended merely as representative of an exemplary method and structure for avoiding loss of track following servo synchronization when switching heads. The particular locations and dimensions shown for track misalignment, for zipper zone size and location, for seek operations, for safe displacements from the zipper zone, etc. are all matters of design choice well known to those of ordinary skill and the art and selected as appropriate for a particular disk drive application and its corresponding mechanical and environmental specifications, tolerances and conditions.

Figure 6:
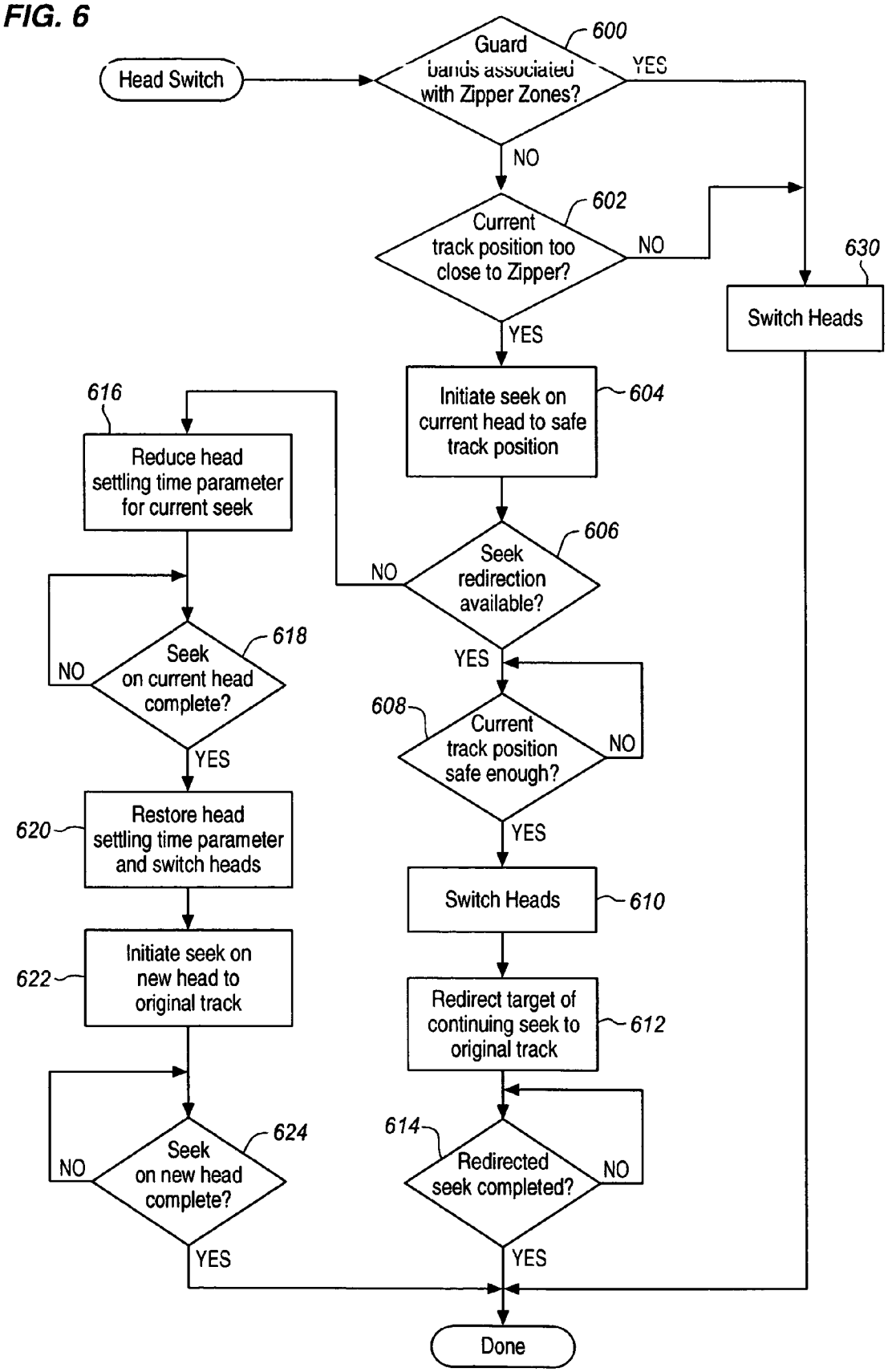
FIG. 6 is a flowchart describing methods associated with features and aspects hereof for avoiding loss of track following synchronization when switching heads between multiple surfaces of a disk drive.

FIG. 6 is a flowchart describing methods in accordance with features and aspects hereof for performing head switch operations in a multiple surface disk drive having densely packed tracks written in a bi-directional manner. The methods of FIG. 6 are operable in response to a determination within a disk drive controller that a head switch operation is required to begin accessing information on a different surface of the disk drive. As noted above, a variety of embodiments for such head switch operations are provided by features and aspects hereof. Multiple such embodiments are described as optional features or paths within the flowchart of FIG. 6. Numerous other equivalent methods and sequences will be readily apparent to those of ordinary skill in the art.

Element 600 is first operable to determine whether the disk drive has been initially formatted with additional guard band tracks associated with each zipper zone of each surface. As noted above, guard band tracks are additional tracks unused by the disk drive but for properly formatted track following servo information usable by the head associated with the surface for maintaining track follower servo synchronization. If the disk has been formatted with additional guard band tracks in accordance with features and aspects hereof, processing continues at elements 630 to perform the requested head switch operation normally. As noted above with respect to FIG. 4, formatting the disk with additional guard bands surrounding each zipper zone in accordance with features and aspects hereof assures that switching from a first head associated with the first surface will not cause the second head to be positioned in unusable, unreadable zipper zone tracks. Therefore, use of the guard band tracks associated with zipper zones in accordance with features and aspects hereof avoids the possibility of losing track follower servo synchronization when switching heads and head switch processing may proceed normally.

If the disk has not been formatted with guard bands associated with each zipper zone of each surface, element 602 is next operable to determine whether the current track position of the first head is too close to the zipper zone associated with that surface. A determination as to whether the current position is too close may be determined in accordance with the particular specifications, conditions and operating environment of the particular disk drive. In general, a worst-case threshold distance may be determined statically or dynamically to assure that switching from the present position on the first head to the corresponding position of the second head cannot utilize the second head while it is presently within the zipper zone of its associated second surface. If element 602 determines that the current track position is not too close to the zipper zone, element 630 is operable as noted above to perform standard head switch operations knowing that the first head position is safely separated from its a zipper zone such that the second head position will not fall within its corresponding zipper zone.

As noted above, the threshold for determining how close is unsafe may be determined in accordance with worst-case parameters of a particular disk drive application. Those of ordinary skill in the art will readily recognize that the threshold distance for safe head switching may be determined in accordance with any appropriate formula or parameters associated with operation of a particular disk drive design, the mechanical tolerances thereof, the particular operating conditions of the disk drive, etc.

If element 602 determines that the current track position of the first head is too close to its corresponding zipper zone to permit safe head switch operations, element 604 is next operable to initiate a seek operation on the first head to move the first head to a safe track position sufficiently distant from the zipper zone of its corresponding surface. Element 606 is then operable to determine whether seek redirection capabilities are available in the disk drive. Seek redirection capabilities of a disk drive allow a seek operation to be ongoing while the target track location of the seek operation is altered. Such a redirected seek operation may start the first head in motion in a direction to move it safely away from the zipper zone only to have the ultimate destination of the seek yet to be determined. The current track position of the first head as the seek progresses is typically a value readable by control logic features of the disk drive controller.

If such seek redirection capabilities are available in the drive, element 608 is operable to await sensing of the current track location indicative of a sufficiently safe distance from the zipper zone of the first disk surface. Once element 608 determines that the first head is moved sufficiently away from the zipper zone, elements 610 is next operable to perform a head switch operation to commence use of the second head. Track following servo controls then resume operation using servo information read from the second head. By virtue of moving the first head sufficiently a way from its zipper zone by operation of elements 604-608, element 610 may safely switch heads to the second head with assurance that the second head will not be positioned within its corresponding zipper zone. Element 612 then the redirects the target of the ongoing seek operation to the original track position from which the first head was moved. The redirected seek operation will then continue moving the comb like structure holding all heads using track following servo information from the second head until the second head is properly positioned at the original track location from which the first head was originally moved by operation of element 604. Element 614 than awaits indication of completion of the redirected seek operation. Upon sensing completion of the redirected seek operation, the second head usable at the intended original location thus providing a safe head switch from the first head to the second head despite the presence of unusable or unreadable zipper zones on all surfaces of the disk drive.

If element 606 determines that seek redirection capabilities are not available or not presently usable in the disk drive, element 616 is next operable to reduce the head settling time parameter for the currently operating seek using the first head location. By reducing the head settling time the first seek operation using the first head may complete more quickly. Since the first seek operation is not intended to precisely position the first head, the head settling time may be reduced to allow more rapid convergence on completion of the first seek operation. Element 618 is then operable to await completion of the first seek operation using the track following servo information read from the first head associated with the current surface. Upon sensing completion of the first seek operation, element 620 is next operable to restore the nominal head settling time parameter used for performing normal seek operations. Element 620 is also operable to perform the head switch operation to commence use of the second head. Since the first head was successfully moved a sufficient distance from its zipper zone, the head switch operation may proceed assured that the second head is also sufficiently distant from its corresponding zipper zone to permit safe head switch operation. Element 622 is operable to initiate a second seek operation using the track following servo information from the second head—assured to be safely displaced from its corresponding zipper zone. The destination for the second seek is the original track location from which the first head was moved by operation of element 604. Element 624 than awaits completion of the second seek operation using the track following servo information read from the second head. Completion of the second seek operation completes the safe head switch operation with the second head now properly located at the original track location from which the first head was moved by operation of element 604.

Those of ordinary skill in the art will recognize of wide variety of equivalent method steps and processes for performing a safe head switch operation exemplified in FIG. 6. For example, although three alternate embodiments are described within a single method in FIG. 6, a single such method may be implemented within a particular disk drive application rather than the combined method shown in FIG. 6. Further, reduction of the head settling time and restoration of the standard head settling time may be optionally omitted if such a parameter is not programmable in a particular disk drive application. Numerous other equivalent steps and further optimizations will be readily apparent to those of ordinary skill in the art as well known matters of design choice.

Figure 7:
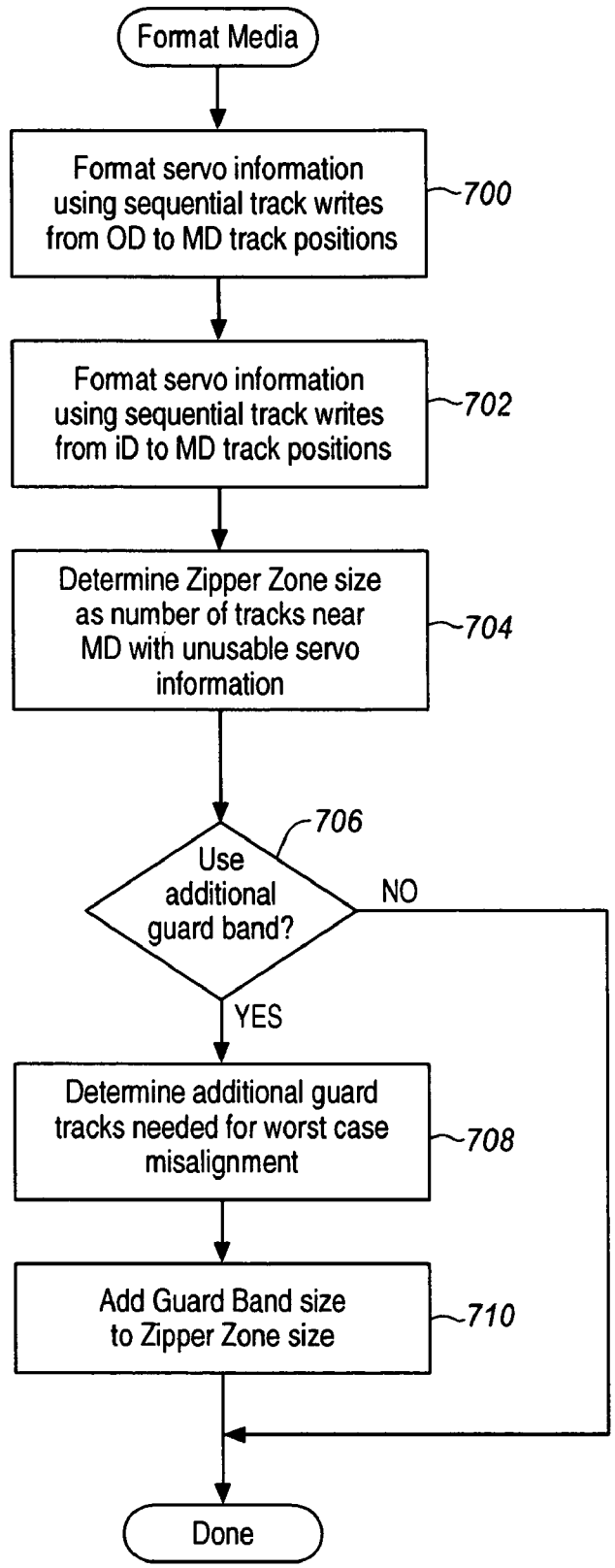
FIG. 7 is a flowchart describing a method associated with features and aspects hereof to initially format a disk drive using bidirectional sequential track writes.

FIG. 7 is a flowchart describing another method in accordance with features and aspects hereof to initially format the surfaces of a disk drive to provide additional guard band tracks if on either side of the zipper zone on each formatted surface of a multiple surface disk drive. Element 700 is first operable to format servo track following information using sequential track writes in a first direction on all surfaces of the disk drive moving from outer diameter (OD) track locations to middle diameter (MD) track locations. Element 702 then performs identical formatting of servo track following information using sequential track writes moving from inner diameter (ID) track positions of all surfaces toward middle diameter (MD) track locations.

The bi-directional, densely spaced sequential track write formatting procedures of elements 700 and 702 inherently create the zipper zone substantially about the middle diameter (MD) track position. One or more such zipper tracks may comprise the zipper zone depending on the degree of overlap of track writes and the desired resultant track pitch. Element 704 is operable to determine the size of the zipper zone as measured in the number of tracks near the middle diameter (MD) track location—i.e., the number of tracks having unusable track following servo information. This parameter may be suitably recorded in an appropriate memory associated with the disk drive controller for later reference.

Element 706 then determines whether the disk drive is configured to utilize additional guard band tracks on either side of each zipper zone. If not, formatting is completed and other methods discussed above for avoiding the zipper zones when switching heads may be applied. If element 706 determines that additional guard band tracks are to be utilized, element 708 is operable to determine a worst-case number of tracks to be used as a guard band on either side of the zipper zone on each surface. Element 710 then records the size of the guard band in a suitable memory associated with the disk drive controller. Similar computations to those described above may be used to determine a threshold for safe distance from the zipper zone and hence the size of the guard band. Those of ordinary skill in the art will recognize a variety of equivalent methods for initially formatting disk drive recording surfaces in a multiple surface disk drive using bi-directional, high radial density, sequential track writing techniques.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above described embodiments that fall within the scope of the invention. As a result, the invention is not limited to the specific examples and illustrations discussed above, but only by the following claims and their equivalents.

What is claimed is:

1. A disk drive having multiple recording surfaces and a corresponding plurality of read/write heads each associated with a corresponding recording surface wherein the plurality of read/write heads are radially movable in unison between an inner diameter radial position and an outer diameter radial position, the disk drive comprising:
a disk controller including:
control logic operable to format each of the plurality of recording surfaces such that a zipper zone having at least one track with unreadable servo track location information is created on each recording surface and a guard band range of tracks is disposed adjacent each side of the zipper zone, and wherein each of the guard band range of tracks have valid track servo information but are unused for storing of user data.

2. The disk drive of claim 1 wherein the guard band range of tracks comprises a number of tracks sufficient to account for worst case misalignment of radial positions on a first recording surface relative to a second recording surface.

3. The disk drive of claim 1 wherein servo information is recorded on said each recording surface with the guard band range of tracks on either side of the zipper zone radial position wherein the guard band range of tracks comprises 100 tracks.

4. The disk drive of claim 1 wherein servo information is recorded on said each recording surface with the guard band range of tracks on either side of the zipper zone radial position wherein the guard band range of tracks comprises a number of tracks ("N") on either side of the radial position of the zipper zone where N is determined in accordance with parameters associated with the disk drive.

5. A disc for use in a disc drive, the disc comprising:
a recording surface having an inner diameter, an outer diameter, and a plurality of overlapping data tracks;
a zipper zone disposed between the inner and outer diameters;
an inner guard band disposed adjacent the zipper zone between the zipper zone and the inner diameter;
an outer guard band disposed adjacent the zipper zone between the zipper zone and the outer diameter; and
wherein the inner and outer guard bands have valid track servo information but are unused for storing of user data.

6. The disc of claim 5, wherein the guard bands comprises a number of tracks sufficient to account for worst case misalignment of radial positions on the recording surface of the disc relative to another recording surface.

7. The disc of claim 5, wherein servo information is recorded on the recording surface in the guard bands and the guard bands comprise 100 tracks.

* * * * *